United States Patent Office 3,238,700
Patented Mar. 8, 1966

3,238,700
HYDROGEN DIFFUSION PROCESS
Johann G. E. Cohn, West Orange, N.J., assignor to Engelhard Industries, Inc., Newark, N.J., a corporation of Delaware
No Drawing. Filed Apr. 20, 1962, Ser. No. 188,956
9 Claims. (Cl. 55—16)

This invention relates to a process for purifying hydrogen and for separating hydrogen from a mixture of gases containing hydrogen by means of selective diffusion of hydrogen through a hydrogen permeable diffusion septum. More particularly, this invention concerns such a process in which the hydrogen permeable septum is a composition comprising palladium and a lesser amount of ruthenium.

Processes for obtaining high purity hydrogen or for separating hydrogen from a mixture of gases containing free hydrogen by means of diffusion through a palladium septum are known. The processes afford a means of producing high purity hydrogen through the use of relatively simple devices.

By "diffusion septum" is meant a membrane, foil, tube, or plurality of such membranes, foils, or tubes; or a coating on a porous support which serves as a barrier between the feed gas and the effluent gas and which is permeable to certain gases. In this invention, the gas to which the septum is permeable is hydrogen.

The techniques of hydrogen diffusion through a permeable diffusion septum are well known to the art, and the distinction between such processes and passage of gases through porous film or membrane need not be further explained in detail. Suffice it to say, that the process of permeation utilized in the present invention involves the passage of hydrogen gas from the high-pressure side of a non-porous septum through the solid material of the septum and out the low-pressure side thereof. The permeable septum which is employed in the practice of the invention is necessarily non-porous, that is essentially free from holes, voids, pores or other defects which affect the continuity of the film.

It is well known that hydrogen will diffuse through palladium selectively. If a mixture of gases containing hydrogen is contacted with one surface of palladium, substantially only hydrogen and its isotopes will diffuse through the palladium so that the hydrogen evolving from the opposite surface is extremely pure. There is hardly a perceptible permeation of any other gases through palladium. At sufficiently high temperatures, the rate of diffusion of hydrogen through palladium is rapid enough so that commercial applications of this means of producing high purity hydrogen have been developed.

A major difficulty which has been experienced in the use of palladium diffusion devices is the marked change in physical characteristics of palladium when it is subjected to alternate periods of heating and cooling in the presence of hydrogen. Repeated cycles of heating and cooling in the presence of hydrogen lead to the deformation and eventual perforation or rupture of the palladium septum. One method of solving this problem is to use a combination of palladium with another metal. Palladium alloy compositions are desirable which will permit a sufficiently high rate of hydrogen diffusion and at the same time will not be subject to or will be less subject to the detrimental effects of temperature changes in the presence of hydrogen. Criteria for such diffusion compositions include comparable or improved behavior as compared to palladium with respect to permeability, and improved mechanical strength and resistance to deformation when subjected to temperature cycles in the presence of hydrogen.

Additionally, the tensile strength of the material used as a diffusion septum as well as its hydrogen permeability and stability is important. In order to realize maximum efficiency in a device which employs the hydrogen diffusion method, particularly where the diffusion septum is used in unsupported form, there must be an optimum relationship between the thickness of the diffusion septum and the gas pressure differential of the upstream and downstream surfaces of the septum. The rate of diffusion of a gas through a metal varies inversely with the thickness of the metal, whereas the rate of diffusion increases as the gas pressure differential increases. A desirable property of a metal composition is sufficient tensile strength so that a diffusion septum of suitable thickness for a high rate of diffusion is capable of withstanding high pressure differentials.

In accordance with this invention, it has been found that certain compositions of palladium and ruthenium are superior to palladium for use as a diffusion septum for the purification of hydrogen or the separation of hydrogen from a mixture of gases. This discovery is surprising and unexpected, since, with rare exceptions, it has hitherto generally been determined that addition of any metal to palladium reduces the permeability of the palladium to hydrogen.

It has now been found certain palladium-ruthenium compositions, containing between about 1% and 10%, preferably between about 2% and 5% by weight ruthenium can be employed for the diffusion of hydrogen and provide greater permeability, higher tensile strength, and improved stability to temperature changes in the presence of hydrogen, as compared to pure palladium.

It has further been found that at elevated temperatures, i.e. from about 200° to 800° C., the alloys of palladium and ruthenium described herein are equal if not superior to known silver-palladium compositions with respect to hydrogen permeability and have greater physical strength.

It has further been found that the palladium-ruthenium alloys of this invention have a higher annealing temperature than pure palladium or palladium-silver alloys. This has the advantage of allowing a Pd-Ru septum to be run at higher temperature than one of Pd-Ag or Pd without loss of physical strength. As diffusion through Pd and its alloys generally increases as the temperature is increased, marked advantages are apparent in the use of the Pd-Ru septum for separation and/or purification of hydrogen.

It has further been found that the palladium-ruthenium compositions of this invention can be used at lower temperatures than pure palladium. The critical temperature of pure palladium, i.e. the temperature above which the $\beta$ phase transition does not occur, is 310° C. The critical temperature for palladium-ruthenium alloys is substantially lower, as determined by dilatometric and hardness tests, and in the case of palladium-4.5% ruthenium, is about 200° C. Thus the palladium-ruthenium alloys of this invention can be employed at relatively low temperatures without encountering diminution of strength due to phase changes of the alloy.

The alloys used in accordance with the present invention, within the broad range indicated above, exhibit a single phase and contain ruthenium in solid solution in the palladium at the temperature employed in effecting the diffusion of hydrogen. In terms of hydrogen permeability and comparative physical strength of diffusion septa, such alloys show superiority to the prior art diffusion materials such as palladium or palladium-silver alloys.

In the paper "The Palladium-Ruthenium System," by A. A. Rudnitskii and R. S. Polyakova given in Russ J.

Inorg. Chem. 4, 631 (1959), the authors develop phase diagrams for the Pd-Ru system. They state:

"The boundary of the α-solid solution based on Pd shifts with rising temperature towards increased Ru concentration. At room temperature, this boundary corresponds to about 5 wt. percent Ru, and at 1400° to 10–15% Ru."

The palladium-ruthenium compositions which are employed in accordance with this invention comprise palladium based solid solutions of palladium-ruthenium containing ruthenium up to the limit of solubility of ruthenium in palladium. Since the solubility of ruthenium in palladium increases with increased temperature, it is apparent that useful compositions may exhibit two phases at lower temperature, for example, palladium-ruthenium compositions containing between about 5% and about 10% ruthenium, but that such compositions are included within the scope of this invention since they exhibit a single phase at the elevated temperatures employed for hydrogen diffusion. In general, palladium-ruthenium compositions used in accordance with this invention should contain no more than about 10% ruthenium. For hydrogen diffusion at lower temperatures, e.g. up to about 800° C., continuous solid solutions of ruthenium in palladium containing below about 8% Ru are employed. A preferred range is 2 to 5% Ru. Compositions containing up to about 5% ruthenium exhibit a single phase at temperatures up to about 725° C.

The temperature range within which the palladium-ruthenium compositions of this invention exhibit superior characteristics is from 200° to 800° C., although higher temperatures can be used. It is usually not practical to operate a hydrogen system above 800° C. because of the effect of such high temperature on parts of the equipment other than the diffusion septum. Temperatures below 200° C., e.g. as low as room temperature, can be used, but the rate of diffusion is then slow, and may be commercially unattractive. The greater strength of Pd-Ru alloys, which is maintained also at higher tempertures than the prior art pure Pd and Pd-Ag alloys used for $H_2$ diffusion, makes the Pd-Ru alloys especially favorable for use under the increased diffusion rate high temperature conditions.

A composition of this invention can be used in any form whereby it serves as a barrier between the upstream and downstream gas. For example, the material may be in the form of a sheet, tube, film or coating on a porous support or a plurality of such forms. The material may be formed in any known manner, but it is important that it be non-porous and of sufficient physical strength. The thinner the material, the harder it is to fabricate with desirable characteristics, but the more desirable in terms of rate of $H_2$ diffusion.

It is desirable to have the solid through which the hydrogen will diffuse as thin as possible since the rate of diffusion of a gas through a metal varies inversely with the thickness of the metal. The rate of diffusion of a gas through a metal is also dependent upon the difference in pressure between the upstream and downstream gases, but an opposing factor is that the thinner the material, the less differential in pressure it can withstand without support. In determining the thickness of the metal to be used, consideration must be given to the pressure differential which the metal is capable of withstanding. However, there is no upper limit as regards pressure differential for the diffusion compositions of this invention, since the pressure differentials which a barrier can withstand can vary with the particular construction of the diffusion septum. For example, a supported membrane can be made to withstand greater pressure differentials than an unsupported membrane, and tubes will generally withstand higher pressure differentials than unsupported, thin films.

The process of the present invention can be employed to separate hydrogen from mixtures of gases in which hydrogen is a major or minor component, and operability of the process is independent of the specific proportion of hydrogen in such gases. Obviously, gaseous mixtures containing minor percentages of hydrogen provide a lower partial pressure of hydrogen, and the rate of diffusion, which is a function of pressure, will as a result be reduced. The invention is valuable as a means for removing hydrogen from gaseous mixtures to provide effluent gases free from hydrogen, and as a means for producing hydrogen streams of high purity.

EXAMPLE I

A palladium-4.5% ruthenium diaphragm was annealed at 600° C. in a vacuum for 16 hours, after having been heated one hour in air at 350° C. followed by hydrogen reduction at 350° C. At 600° C., hydrogen was contacted with the diaphragm and measurements of permeability were determined. The permeability of the diaphragm was then determined at various temperatures as shown in Table I.

Permeability of a palladium-25% silver diaphragm was determined at 350° C. and 600° C. The results in Table I indicating permeability rates for palladium-27% silver at 450° C. and 550° C. are calculated from the data given in U.S. Patent No. 2,773,561.

The permeability rate for pure palladium at 350° C. given in Table I is an average of several tests. Hydrogen permeability rates for pure palladium at 450° C. and 550° C. were calculated from the above-mentioned patent.

The data in Table I are tabulated in cubic feet of hydrogen at standard conditions per square inch of 1 mil thick diaphragm at a partial pressure differential between the upstream and downstream hydrogen such that the square root of the partial pressure difference, expressed as $(p.s.i.a.)^{1/2}$, is unity. Expressed in other terms:

Permeability = s.c.f.$H_0$ = flow rate
$(s.c.f.H)/(p.s.i.a.)^{1/2}(inch)^2(mil)^{-1}$ It will be realized that the method of expressing the experimental results is independent of the particular thickness of sample tested and particular pressure employed. In the present example, most of the data was obtained from tests on 30 mil thick septa at a pressure of 200 p.s.i.g.

TABLE I

*Hydrogen permeability in s.c.f.$H_0$*

| T ° C. | Pd. | Pd-25 Ag. | Pd-27 Ag. | Pd-4.5 Ru |
|---|---|---|---|---|
| 250 | | | | 0.058 |
| 300 | | | | 0.071 |
| 350 | | .065 | 0.088 | | 0.113 |
| 400 | | | | 0.131 |
| 450 | | .093 | | 0.148 | 0.154 |
| 500 | | | | 0.171 |
| 550 | | .138 | | 0.174 | 0.181 |
| 600 | | | 0.170 | | 0.211 |

The results in Table I show that the hydrogen permeability of palladium-4.5% ruthenium is superior over a broad temperature range to palladium and to typical palladium-silver composites known to the art. It can also be seen that the hydrogen permeability of the palladium-4.5% ruthenium alloy at a given temperature in the range from about 300° C. to about 600° C. is greater than the hydrogen permeability of palladium alone at temperatures 100° C. higher.

A palladium-10% ruthenium composition was tested for hydrogen permeability at temperatures of 350° C. and 600° C. The permeability in s.c.f.$H_0$ at these temperatures, was determined to be 0.0186 and 0.050 respectively. At each of these temperatures, a palladium-10% ruthenium composition contains ruthenium in excess of that which will dissolve to form a solid solution, resulting in two phases in the composition.

EXAMPLE II

A number of tests were performed to show the comparative physical strength characteristics of pure palladium, palladium-silver and the palladium-ruthenium compositions of this invention. The conditions under which the tests were performed and the results of the tests are given in Tables II and III.

Room temperature tensile tests were performed on strip specimens of 2 inch guage, 3 mil thickness and 0.25 inch width. In order to evaluate the samples on a comparative basis, it was necessary to have all samples in the same physical state with respect to their condition of cold work. Hence, all samples were annealed at 900° C. for 10 minutes in a vacuum. All three materials are completely annealed by this treatment. The results are tabulated in Table II.

TABLE II

| Material | Strength properties—room temperature | |
|---|---|---|
| | Ultimate tensile strength (p.s.i.) | Yield strength (p.s.i.) |
| Pd | 43,250 | 17,200 |
| Pd-25% Ag | 67,500 | 40,000 |
| Pd-4.5% Ru | 83,800 | 55,800 |

From the results in Table II, it is evident that palladium-ruthenium compositions have greater tensile strength than pure palladium or palladium-25% silver. Therefore, for a given thickness of material, a palladium-4.5% ruthenium diffusion septum will withstand greater pressure differentials with attendant increase in the rate of hydrogen diffusion.

In practice it has been found advantageous to use the hydrogen diffusion septum in the form of a tube or a cluster of tubes. A realistic test for evaluating the comparative physical strength of metals so used is one in which the ultimate hoop stress of the materials is determined. The hoop stress gives the relationship between the differential pressure, the diameter, and the wall thickness of a cylindrical vessel and the ultimate hoop stress is the value of this relationship at rupture.

The ultimate hoop stress of cylinders of palladium, palladium-silver and palladium-ruthenium composites were determined at 350° C. in the presence of hydrogen. Tests were performed on specimens of ¼" and ⅛" tubing of 4 mil wall thickness in the cold worked state and after annealing at 800° C. for ½ hour in a vacuum. The average values of results of the tests are given in Table III.

TABLE III

*Ultimate hoop stress on tubing in the presence of hydrogen*

| Material | T ° C. | Tube conditions | Ultimate hoop stress (p.s.i.) |
|---|---|---|---|
| Pd | 300 | Cold worked | 23,000 |
| Pd-25 Ag | 350 | Annealed | 30,500 |
| Pd-4.5 Ru | 350 | do | ¹ >36,400 |

¹ Could not be burst with available pressure.

The ultimate hoop stress results given are the highest of a comparative series of tests, as slightly lower results may be incorrect because of small defects in the material. As annealed Pd tubing is weaker than cold worked Pd tubing, it is seen that the annealed Pd-4.5 Ru tubes are strongest, with annealed Pd-25 Ag tubes less strong, and Pd tubes the weakest.

EXAMPLE III

A severe test was devised for tubing to determine the effects of repeated β-phase transformations on the physical strength of metals to be used as hydrogen diffusion septa. Typically, a 22-inch long specimen of 95.5 palladium-4.5 ruthenium tubing which had a 4 mil wall thickness and ⅛" diameter was placed in a furnace. The specimen was placed in the furnace in such a manner that the center of the specimen was 350° C. and both the ends were at approximately room temperature.

Hydrogen was introduced into the tubing to a pressure of 100 p.s.i.g. The pressure on the outer or downstream side of the tubing was maintained at 0 p.s.i.g. When the hydrogen pressure upstream reached 100 p.s.i.g., the hydrogen was permitted to bleed out until an equilibrium pressure of 1 atmosphere was attained. Consequently the hydrogen was diffusing through the tube for a sufficient length of time at pressures up to 100 p.s.i.g. for portions of the tubing, which were at optimum temperature-pressure conditions, to undergo β-phase transformation. The temperature most suitable for such transformation in palladium-4.5 ruthenium is below 200° C. At 40 p.s.i.g. it was found to be about 185° C. At higher pressure, β-phase transformation would be expected to occur above 185° C., but not higher than 200° C., as compared to 310° C. maximum for pure Pd.

The hydrogen was then evacuated and the equipment nitrogen-checked for leaks. The nitrogen was then removed. It should be noted that as the hydrogen was evacuated, any portion of the tubing which had undergone β-phase transformation would tend to undergo a change back to its α-phase. The kinetics of the transformation are such that the transformation back to α-phase was probably complete at temperatures between 150 and 200° C.

The specimen was subjected to this treatment for five complete cycles. For the sixth cycle, the hydrogen pressure was increased to 200 p.s.i.g. This type of treatment was repeated for the 7th and 8th cycles.

Examination of palladium-ruthenium tubing subjected to this severe treatment showed no macroscopic deformation of the tubing. Hardness tests over the entire length of the tubing showed no significant variation in hardness.

It is significant that although β-phase transformation did occur in the materials at points of optimum temperature for such transformation, no harmful effects were observed. These results are in contrast to those obtained in similar cycles between α and β phases with pure Pd.

What is claimed is:

1. A process for separating hydrogen from a mixture of gases containing hydrogen which process comprises contacting said gaseous mixture with one side of a non-porous septum composed of palladium containing from about 1 to about 10% by weight ruthenium, said septum being a solid solution of ruthenium in palladium at the temperature employed for hydrogen diffusion, causing the hydrogen to diffuse through said septum and removing hydrogen from the opposite side of said septum.

2. The process of claim 1 wherein said septum contains from about 2 to about 5% by weight ruthenium.

3. The process of claim 1 wherein the hydrogen diffusion is effected at a temperature in the range of about 200° to about 800° C.

4. The process of claim 1 wherein said septum is in the form of a tube.

5. The process of claim 1 wherein said septum is in the form of a foil.

6. The process of claim 5 wherein said foil is on a rigid, porous support.

7. A process for purifying hydrogen which comprises contacting a mixture of gases containing hydrogen with one side of a non-porous septum composed of palladium containing from about 1 to about 10% by weight ruthenium, said septum being a solid solution of ruthenium in palladium at the temperature employed for hydrogen diffusion, maintaining a pressure differential between the two sides of said septum whereby hydrogen diffuses therethrough, and removing the pure diffused hydrogen from the other side of said septum.

8. The process of claim 7 wherein said septum contains from about 2 to about 5% by weight ruthenium.

9. The process of claim 7 wherein said contacting is effected at a temperature in the range of about 200° to about 800° C.

References Cited by the Examiner

UNITED STATES PATENTS

| 2,824,620 | 2/1958 | De Rosset | 55—16 |
| 2,958,391 | 11/1960 | De Rosset | 55—16 |
| 3,155,467 | 11/1964 | Yamamoto et al. | 55—16 |

FOREIGN PATENTS 556,431  10/1943  Great Britain.

REUBEN FRIEDMAN, *Primary Examiner.*
HERBERT L. MARTIN, *Examiner.*